2,848,450

MORPHOLINIUM CHLORIDES

Bernard Rudner and Marguerite E. Brooks, Baltimore, Md., assignors to W. R. Grace & Co., New York, N. Y., a corporation of Connecticut No Drawing. Application January 5, 1956
Serial No. 557,454

11 Claims. (Cl. 260—247.5)

This invention relates to compounds of morpholine, and in one specific aspect it relates to the quaternized morpholine-containing compounds known as N-aminomorpholinium chlorides.

Heretofore only the 4-methyl-4-aminomorpholinium chloride has been known. Its preparation represents a tedious 3-step procedure, in which one of the intermediate compounds formed is relatively unstable. Morpholine can be reacted with nitrous acid to form nitrosomorpholine, a comparatively unstable compound. By employing proper laboratory techniques this compound may be converted to the more stable 4-aminomorpholine which is the classical parent product for the aminomorpholinium chlorides. By reacting this compound with an alkylating agent such as methylchloride, the 4-methyl-4-aminomorpholinium chloride is formed. It is conceivable that a variety of these mropholinium compounds could be prepared by varying the choice of the alkyl halide employed. However, potential use of this general class of compounds has been curtailed by the relative difficulty of reducing this process to commercial operation.

It has recently been discovered that chloramine reacts with tertiary amines to form 1,1,1-trisubstituted hydrazinium chlorides. This reaction has broached a new sphere of potential chemistry related to hydrazine derivatives. Tertiary amines are readily available bases and since chloramine can be prepared in an economic and commercially feasible manner by the well known process of Harry H. Sisler et al, described in U. S. Patent No. 2,710,248, by the gaseous reaction of chlorine and ammonia, the potential application of this reaction is virtually limitless. The reaction may be conducted in anhydrous solution using either an excess of the amine as the solvent or in the presence of an unreactive organic solvent, or in aqueous solution if such conditions are found to be preferable. The term unreactive as applied to the solvent is intended to embrace those solvents which do not react preferentially with chloramine, ammonia, or the selected tertiary amine under the conditions employed. Chloramine may be utilized either in solution or as a gaseous mixture. If gaseous chloramine is employed it is desirable to have base such as ammonia present to stabilize the chloramine, and nitrogen may, although its presence is not essential, be used as a diluent for this gaseous mixture. In anhydrous solution, the hydrazinium chloride generally precipitates as the reaction proceeds. When an aqueous medium is employed, it is generally necessary to concentrate the solution or to evaporate to dryness to obtain the desired hydrazinium salt.

We have discovered a new generic class of hydrazinium salts, viz, heretofore unknown aminomorpholinium chlorides have the general formula:

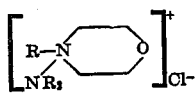

4-R-4-aminomorpholinium chloride wherein R is a member selected from the group consisting of alkyl radicals having at least 8 contiguous carbon atoms, hydroxyalkyl radicals, aminoalkyl radicals, aralkyl radicals, and aryl radicals. Therefore our invention would provide inter alia such compounds as 4-aminococomorpholinium chloride, 4-amino-4-tallowmorpholinium chloride, 4-amino-4-β-hydroxyethylmorpholinium chloride, 4-phenyl-4-aminomorpholinium chloride.

It is therefore an object of our invention to provide a new class of potentially useful hydrazinium salts which can be made in commercial quantities.

In accordance with our invention a 4-(or N-)substituted morpholine (many of which are items of commerce) is reacted with chloramine to produce the desired morpholinium chloride. Our compounds may be prepared in aqueous or anhydrous solution depending upon the preferable condition for the selected compound to be prepared. We can employ as an unreactive organic solvent for our reaction such solvents as trichloroethylene, chloroform, dimethylformamide, xylene, dioxan, or ethyl ether. For parent amines we can employ any of a large number of substituted morpholines, a few of which are listed in Table I.

Our invention is further illustrated by the following examples:

Example I

A generator was constructed to produce a gaseous mixture of chloramine and ammonia using the aforementioned process of Harry H. Sisler et al. Such a chloramine-ammonia gaseous mixture was passed into 20 ml. of β-hydroxy-ethylmorpholine in 50 ml. of xylene for 47 minutes. Because the reaction was exothermic, use of a cold water bath was required to maintain the temperature at approximately 30° C. The copious white precipitate formed during gasification blocked the inlet tube and necessitated cutting the reaction period short. (Use of an agitator, and increased amounts of solvent, eliminated this difficulty in subsequent runs.) The filtered, washed and dried solid, wt. 14.6 g., consisted of glistening off-white plates, melting at 149–152° C. It was, by chloride titration, 96% pure 4-amino-4-(2-hydroxyethyl)-morpholinium chloride:

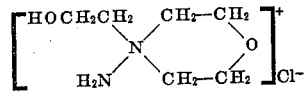

The amount of product obtained represented approximately 60% of the theoretical yield. Two recrystallizations from absolute alcohol gave transparent, gleaming plates melting at 154–155° C. The pure product was very water-soluble, recrystallizable from absolute alcohol, and decreasingly soluble in less polar solvents. Its aqueous solutions yielded a water-insoluble picrate consisting of rectangular yellow plates melting at 132–133° C. when treated with aqueous picric acid. Such solutions also formed an immediate, heat-sensitive, flocculent white solid with sodium tannate, which after separation was found to decompose at 188–191° C. The hydroxyl group of our novel product is reactive, and has been converted to interesting esters, urethans, and other products.

Example II

The gaseous mixture of chloramine and ammonia described in Example I was passed into 20 ml. of cocomorpholine (a technical product produced by Armour & Company containing a mixture of 4-alkyl morpholines of the general formula:

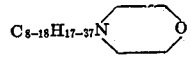

in 50 ml. of xylene for 72 minutes. The temperature rose to 48° C. during the reaction, a gelatinous white solid

TABLE I

| Morpholine | Name of Product | Structure of Product |
|---|---|---|
| 4-methylmorpholine | 4-amino-4-methylmorpholinium chloride. |  |
| 4-n-octylmorpholine | 4-amino-4-n-octylmorpholinium chloride. | 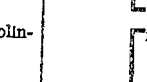 |
| n-Octadecadienyl-morpholine | 4-amino-4-octadecadienylmorpholinium chloride. | 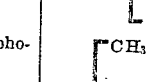 |
| N-(2-hydroxypropyl)-morpholine | 4-amino-4-(2-hydroxypropyl)-morpholinium chloride. | 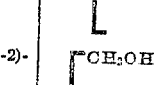 |
| 4-(1,3-dihydroxypropyl-2)-morpholine | 4-amino-4-(1,3-dihydroxypropyl-2)-morpholinium chloride. | 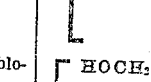 |
| Morpholino-glucoside | 4-amino-4-glucosylmorpholinium chloride. | 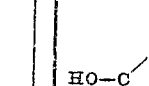 |
| 4-(3-stearoyloxy-2-hydroxypropy)-morpholine. | 4-amino-4-(3-stearoyloxy-2-hydroxypropyl)-morpholinium chloride. | 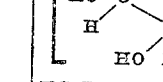 |
| 4-[β-(12-hydroxystearoylamido)-ethyl] morpholine. | 4-amino-4-[β-(12-hydroxystearoylamido)-ethyl] morpholinium chloride. | 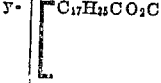 |
| 4-(2-amino-3-hydroxypropyl)-morpholine. | 4-amino-4-(2-amino-3-hydroxypropyl)-morpholinium chloride. | 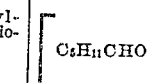 |
| Dimorpholino-methane | 4-amino-4-(morpholino-N-methylene)-morpholinium chloride. | 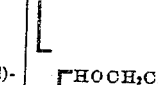 |
| β-(bis-carboxymethyl)-amino-ethylmorpholine. | 4-amino-4[β-(bis-carboxymethyl)-amino-ethyl]-morpholinium chloride. |  |
| 4-(p-phenetyl)-morpholine | 4-amino-4-(p-phenetyl)-morpholinium chloride. | 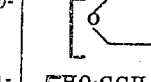 |
| 2,4,6-tris-(morpholinomethyl)-phenol | 4-amino-4 [3,5-bis-(morpholino-N-methyl)-2-hydroxybenzyl] morpholinium chloride. | 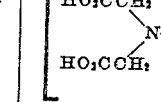 | was formed, and the reaction mixture became quite viscous. Filtration (a very slow process) gave 17 g. of crude 4-amino-4-cocomorpholinium chloride:

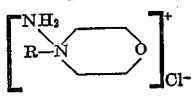

wherein R varies from $C_8H_{17}$ to $C_{18}H_{37}$ but is mostly $C_{12}H_{25}$. Trituration with acetone and subsequent extraction with 2-propanol gave an off-white solid consisting of small stubby needles. With continuous application of heat the needles became transparent at 100–101° C. and melted clear at 141–144° C. Our novel product was readily soluble in water with the formation of a soapy solution (i. e., one which foams and feels slick). It was appreciably soluble in alcohol, somewhat less soluble in 2-propanol, and decreasingly soluble in acetone, xylene and trichloroethylene. From aqueous solution it yielded a waxy hexafluorophosphate, M. P. 137–141° C., and a waxy yellow picrate, M. P. 92–94° C. (becoming transparent at 50° C.), when treated with the appropriate reagents.

*Example III*

The procedure of Example II was repeated, using a 10% chloroform solution of a mixture of alkyl morpholines available commercially as "tallowmorpholine." This brown liquid is described by its manufacturer as being

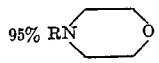

wherein R is a mixture including $C_{14}H_{29}$, $C_{16}H_{33}$, $C_{18}H_{35}$, and $C_{18}H_{37}$ in roughly a ratio of 1:12:23:14 parts. During the reaction, a considerable portion of the solution was lost through foaming. The grey semisolid which formed during reaction was separated from the chloroform solution and washed with considerable solvent. It consisted chiefly of ammonium chloride. Evaporation of the filtrate gave a brown wax, crude 4-amino-4-tallowmorpholinium chloride, which softened and melted above about 43° C. with the application of heat.

When excess tallowmorpholine was used as its own reaction medium, a mildly exothermic reaction ensued during which both foam and a semisolid precipitate formed. Filtration of the off-white, slimy precipitate, followed by copious washing with hexane, gave as a product, aminotallowmorpholinium chloride, contaminated with ammonium chloride. It was purified by extraction with acetone, and subsequent extraction of the acteone-soluble tan wax with 2-propanol. The propanol-soluble wax thus obtained readily formed soapy aqueous solutions (i. e. solutions which foamed and felt slick to the touch). This novel compound was soluble in alcohol, acetone, and chloroform, and somewhat less soluble in other organic solvents. On the melting block, it became transparent at 48–51° C., and melted at 110° C. with gas evolution. It formed a hexafluorophosphate, melting at 63–66° C. with the addition of $KPF_6$. A partial resolution of the product into more and less saturated molecules can be made on the basis of solubility, the lower-melting, less saturated (i. e. higher in $C_{18}H_{35}$) portion being more soluble in ether or acetone.

*Example IV*

To 30 mls. of xylene solution, containing 0.50 g. of chloramine (as determined iodimetrically) was added 1.5 g. (=approximately .011 mole) N-3-aminopropylmorpholine at room temperature. The clear mixture was allowed to stand overnight, during which time a thick red oil, containing some solid, formed. The oil, crude 4-amino-4-(3-aminopropyl)-morpholinium chloride which was isolated by decantation, weighed slightly more than one gram. This novel product was purified by dissolving it in a limited quantity of 2-propanol (which freed it from ammonium chloride) and pouring it into three volumes of ether. The thick brown oil thus obtained as precipitate could not be transformed to a solid by chilling, vacuum-drying, or trituration. The purified product was readily soluble in water and markedly soluble in 2-propanol, but decreasingly soluble in acetone and ether. In aqueous solution, it was a strong reducing agent (to alkaline permanganate). It did not form a water-insoluble hexafluorophosphate with $KPF_6$. However, when treated with 5-nitro-barbituric acid, it formed a diliturate which sublimed without melting from 265° C. on.

The difference in reactivity of the $-NH_2$ amino nitrogen and the quaternized nitrogen was exemplified by a study of the tannic acid derivatives of the product. With weakly alkaline sodium tannate, the product formed immediately a white hydrazinium tannate, recrystallizable from water as grey microcrystals which decompose with marked swelling at 223–226° C. With aqueous tannic acid solution, the aminomorpholinium chloride yielded a water-insoluble white hydrazinium chloride tannate (a salt of the amine $NH_2$), far more stable to light and air oxidation than the hydrazinium tannate, darkening at 189° C., and melting with gas evolution of 202–204° C. Boiling an aqueous solution of our novel product with an aqueous tannic acid-sodium tannate solution gave an intractable brown gum, presumably the decomposition product of the tannic acid salt of the aminohydraziniumtannate. With a saturated aqueous solution of picric acid, 4-amino-4-(3-aminopropyl)-morpholinium chloride slowly deposited stubby brown needles of the chloride picrate, sintering and darkening at 169° C., M. P. 201–203° C.

*Example V*

Morpholinomethyl-m-cresol was prepared by the following reaction, using essentially the procedure desired by H. A. Bruson and C. W. MacMullen in the Journal of the American Chemical Society 63, 270 (1941):

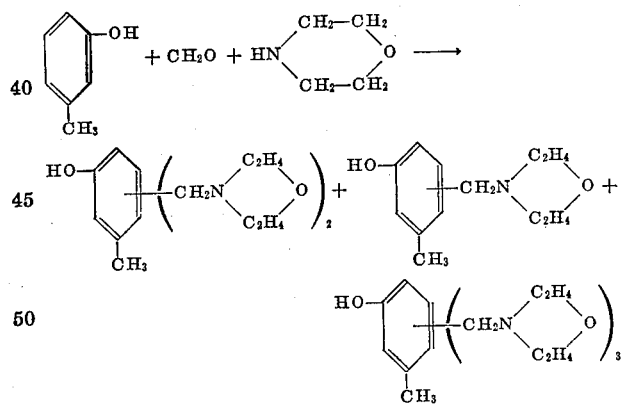

The crude oily product, isolated by decanting off the upper aqueous layer of the reaction mixture, was dissolved in three volumes of chloroform, washed with two successive volumes of cold water to remove the more soluble bis- and tris-condensates, and dried over anhydrous magnesium sulfate. The dried, clear chloroform solution was then saturated with the previously described chloramine-ammonia gas stream for 48 minutes. During this time, the temperature of the reaction mixture dropped slightly, and a white solid formed. Approximately thirty minutes after gassing had been stopped, effervescence within the flask ceased. The reaction mixture consisted of red solvent, red oil of lesser density, and white solid. Filtration gave 6.7 g. of washed and dried crude 4-amino-4-(cresylmethyl)-morpholinium chloride:

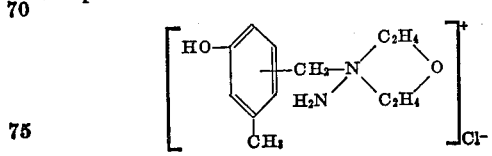

This novel product charred and decomposed at 190–210° C. Recrystallization of our new compound from 2-propanol gave transparent prisms which melted with darkening and gas evolution at 158–160° C. By treating it with aqueous sodium picrate a picrate derivative consisting of thick greenish-yellow needles was obtained. On the melting block, this novel derivative exhibited inchoate sublimation above 168° C. and darkened without melting above 250° C. It did not yield a water-insoluble hexafluorophosphate. However, it formed a diliturate (which decomposed above 265° C.) when treated with 5-nitro-barbituric acid. Our product was soluble in water, less soluble in alcohol and 2-propanol, and relatively insoluble in other solvents. With ferric chloride in either water or pyridine, it exhibited a yellow color. It gave a precipitate with excess aqueous silver nitrate which was part AgCl and part organic complex. Our compound was, in neutral and alkaline solution, a strong reducing agent. In qualitative tests, it underwent most of the usual chemical reactions shown by phenols.

The reaction hereinbefore described produced at least two other products. From the original precipitate was obtained, by a tedious process of recrystallization, a low yield of white prisms which we believe to be 4-amino-4-[(2 - hydroxy - 5 - morpholinomethyl - 4 - methyl) - benzyl] morpholinium chloride, although alternate structures could be postulated. It was found to be a water-soluble, solvent-insoluble solid that decomposes at approximately 180° C., with gas evolution. In addition, there has been obtained from the filtrate of the reaction mixture, a betaine of the probable structure:

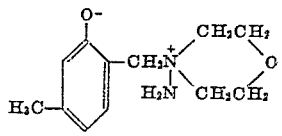

This interesting compound was obtained as a tan solid which, as isolated, melted at 110–131° C.

Based on the parent amine utilized in the reaction, the over all conversion to hydrazinium salts was approximately 83% of theoretical. The product initially described, 4-amino-4-(cresylmethyl)-morpholinium chloride, represented about three-fourths of the total amount of hydrazinium salts formed as a result of this conversion.

Example VI 4-phenylmorpholine-(25 g. in 100 ml. of chloroform) was subjected to a chloramine-ammonia gas stream as described earlier, for 48 minutes. An exothermic reaction ensued (although vaporization of chloroform caused the temperature of the solution to drop slightly) and a white precipitate was formed almost immediately. Once the gas stream was cut off, the temperature of the reaction mixture increased suddenly to 45° C., and remained at that point for almost an hour. After it had cooled to room temperature, the flask contained a cluster of fine crystals in a very dark liquid. Filtration and drying gave crude 4-amino-4-phenylmorpholinium chloride, melting at 197–201° C. Analysis showed this novel product to be formed in approximately 50% yield. As isolated, it contained about one-third ammonium chloride by weight. Subsequent purification via 2-propanol produced fine, stubby needles melting at 202–204° C.

Our new compound was readily soluble in water, moderately soluble in hot 2-propanol, and insoluble in non-polar solvents.

Our novel products exhibit great utility in a wide range of applications. The hydroxylic and phenolic compounds, as well as the aminoalkyl derivatives, are useful pharmaceutical intermediates. These compounds are the stepping stone to their more useful esters, amides and urethanes. It is well-known, for example, that aralkyl esters of morpholinoethanol are commercially and medicinally important antispasmodics. It has been shown (see Protiva, Miroslav and Exner, Coll. Czech. Chem. Commun. 19, 531 (1954)) that conversion of basic antispasmodic esters to their hydrazinium chlorides greatly increase the pharmacodynamic activity of those compounds.

Our novel aryl and aralkyl compounds are valuable dye intermediates. The properties of the dyes made by adding these hydrazinium salts to a solution of an acid dye vary with the chain length of the R constituent of the hydrazinium salt as well as with the acid dye used. Dyes thus produced cover the entire spectrum of solubility. Those of low molecular weight are water soluble; as their molecular weight is increased they range from organic solvent soluble to pigments.

Our phenolic aminomorpholinium compounds have been used to make novel polymers, useful as polyelectrolytes and ion exchangers. For example, condensations of the product from chloramine and morpholinomethyl metacresol with formaldehyde, with or without added reactants, yield highly infusable polymeric hydrazinium chlorides which are effective anion-exchange resins. When solution of sodium sulfate is passed through a column of this polymer, the polymeric sulfate is formed and equivalent chloride is liberated.

Our aminoalkyl morpholinium chlorides can be converted to useful surfactants by either neutralization with an inexpensive fatty acid (e. g. soy or tallow) or by conversion to the amide on heating with the same fatty acid.

When the R group in our novel compounds is octyl to dodecyl, they make excellent additives for photographic developing baths because of their selective reducing properties. These same compounds are most effective as catalysts for the preparation of poly-urethanes. For instance, poly-urethanes are made commercially by the condensation of di or tri isocyanate with a glycol, frequently polymeric. A catalyst is required to speed the reaction to that point where the water present in the condensation mixture will start a rapid foaming action. Our compounds are highly satisfactory for this purpose.

We claim:

1. New chemical compounds, having the general formula:

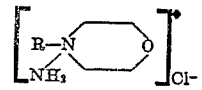

wherein R is a radical selected from the group consisting of higher alkyl radicals having from 8 to 24 contiguous carbon atoms, alkenyl radicals having from 8 to 24 contiguous carbon atoms, alkadienyl radicals having from 8 to 24 contiguous carbon atoms, hydroxyloweralkyl radicals, primary aminoloweralkyl radicals, benzyl radicals, and phenyl radicals.

2. New chemical compounds, having the general formula:

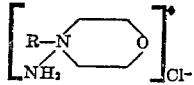

wherein R is a higher alkyl radical having from 8 to 24 contiguous carbon atoms.

3. New chemical compounds, having the general formula:

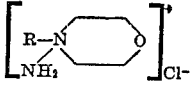

wherein R is a hydroxyloweralkyl radical.

4. New chemical compounds, having the general formula:

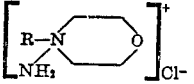

wherein R is a primary aminoloweralkyl radical.

5. New chemical compounds, having the general formula:

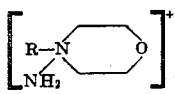

wherein R is a benzyl radical.

6. New chemical compounds, having the general formula:

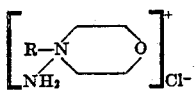

wherein R is a phenyl radical.

7. As a new chemical compound 4-amino-4-tallowmorpholinium chloride.

8. As a new chemical compound 4-amino-4-$\beta$-hydroxyethylmorpholinium chloride.

9. As a new chemical compound 4-amino-4-(3-aminopropyl)-morpholinium chloride.

10. As a new chemical compound 4-amino-4-(m-cresylmethyl)-morpholinium chloride.

11. As a new chemical compound 4-amino-4-phenylmorpholinium chloride.

References Cited in the file of this patent

Knorr et al.: Berichte der deutschen chemischen Gesellschaft, vol. 35, pp. 4474–78.